United States Patent
Liu et al.

(10) Patent No.: US 12,539,159 B2
(45) Date of Patent: Feb. 3, 2026

(54) CRYOABLATION CATHETER

(71) Applicants: ZHUHAI DAHENGQIN TECHNOLOGY DEVELOPMENT CO., LTD., Guandong (CN); PIEDMONT MEDSYSTEMS (ZHUHAI) CO., LTD., Guangdong (CN)

(72) Inventors: Yue Liu, Guangdong (CN); Jiahua Xiao, Guangdong (CN)

(73) Assignee: ZHUHAI DAHENGQIN TECHNOLOGY DEVELOPMENT CO., LTD., Guandong (CN)

( * ) Notice: Subject to any disclaimer, the term of this patent is extended or adjusted under 35 U.S.C. 154(b) by 875 days.

(21) Appl. No.: 17/758,787

(22) PCT Filed: Jan. 12, 2021

(86) PCT No.: PCT/CN2021/071300
§ 371 (c)(1),
(2) Date: Jul. 13, 2022

(87) PCT Pub. No.: WO2021/143681
PCT Pub. Date: Jul. 22, 2021

(65) Prior Publication Data
US 2023/0044913 A1 Feb. 9, 2023

(30) Foreign Application Priority Data

Jan. 13, 2020 (CN) .......................... 202010032115.4
Mar. 16, 2020 (CN) .......................... 202010183771.4

(51) Int. Cl.
*A61M 25/10* (2013.01)
*A61B 18/02* (2006.01)
(Continued)

(52) U.S. Cl.
CPC ............. *A61B 18/02* (2013.01); *A61M 25/10* (2013.01); *A61B 2018/00178* (2013.01);
(Continued)

(58) Field of Classification Search
CPC .......... A61B 18/02; A61B 2018/00178; A61B 2018/00577; A61B 2018/0212;
(Continued)

(56) References Cited

U.S. PATENT DOCUMENTS

2002/0045852 A1* 4/2002 Saab ....................... A61F 7/123
604/113
2002/0045925 A1 4/2002 Keller et al.
(Continued)

FOREIGN PATENT DOCUMENTS

CN 2508778 Y 9/2002
CN 102223848 A 10/2011
(Continued)

OTHER PUBLICATIONS

EP Application No. 21740814.5-1113, EP Communication dated Mar. 13, 2023, 8 pages.
(Continued)

*Primary Examiner* — Ankit D Tejani
*Assistant Examiner* — Joshua Brendon Solomon
(74) *Attorney, Agent, or Firm* — Boisbrun Hofman, PLLC

(57) ABSTRACT

A cryoablation catheter, comprising a balloon and a delivery catheter passing through the balloon. The delivery catheter is provided with a fluid inflow cavity and a fluid outflow cavity therein. The fluid inflow cavity extends into the balloon, and a side wall of the fluid inflow cavity is provided with a spray head that injects a liquid into the balloon. The spray head has a number of spray holes circumferentially arranged on the exterior of the fluid inflow cavity. An end of the fluid outflow cavity has a cross section that seals the fluid
(Continued)

outflow cavity, and a side wall of the fluid outflow cavity is provided with a reflow hole in communication with the balloon (1). A fluid flows from the fluid inflow cavity through the nozzle holes into the balloon. The nozzle holes are evenly distributed outside the fluid inflow cavity, so that the interior of the balloon is uniformly filled with the refrigeration fluid, ensuring the uniformity of heat exchange at each part of the balloon in an axial direction. The fluid then flows out from the reflow hole. The structural design can effectively improve the heat exchange efficiency of the fluid, and the production and processing processes are relatively simple.

20 Claims, 9 Drawing Sheets

(51) Int. Cl.
*A61B 18/00* (2006.01)
*A61M 25/00* (2006.01)

(52) U.S. Cl.
CPC ............ *A61B 2018/00577* (2013.01); *A61B 2018/0212* (2013.01); *A61B 2018/0262* (2013.01); *A61M 2025/0004* (2013.01); *A61M 2025/1061* (2013.01); *A61M 2025/1072* (2013.01); *A61M 2025/1075* (2013.01)

(58) Field of Classification Search
CPC .... A61B 2018/0262; A61B 2018/0022; A61B 2018/00255; A61B 2018/00434; A61B 2018/00511; A61M 25/10; A61M 2025/0004; A61M 2025/1061; A61M 2025/1072; A61M 2025/1075
See application file for complete search history.

(56) References Cited

U.S. PATENT DOCUMENTS

| | | |
|---|---|---|
| 2007/0299433 A1 | 12/2007 | Williams et al. |
| 2009/0209949 A1 | 8/2009 | Ingle et al. |
| 2010/0130970 A1 | 5/2010 | Williams et al. |
| 2012/0158104 A1 | 6/2012 | Keller et al. |
| 2013/0018366 A1 | 1/2013 | Wu et al. |
| 2015/0126986 A1 | 5/2015 | Kelly et al. |
| 2015/0196740 A1* | 7/2015 | Mallin ................... A61B 18/02 606/21 |

FOREIGN PATENT DOCUMENTS

| | | |
|---|---|---|
| CN | 103930061 A | 7/2014 |
| CN | 208625843 U | 3/2019 |
| CN | 110115798 A | 8/2019 |
| CN | 110313984 A | 10/2019 |
| CN | 110507406 A | 11/2019 |
| CN | 111281527 A | 6/2020 |
| CN | 212165881 U | 12/2020 |
| JP | 2012-509146 A | 4/2012 |
| WO | 2013162700 A1 | 10/2013 |

OTHER PUBLICATIONS

JP Application No. 2022-543167, Notice of Refusal dated Sep. 30, 2024, and English Translation, 10 pages.
PCT/CN2021/071300 Written Opinion/International Search Report dated Mar. 26, 2021, 10 pages in Chinese.
PCT/CN2021/071300 Written Opinion/International Search Report dated Mar. 26, 2021, 8 pages English Translation.

* cited by examiner

C-C 22  21                    23

21  2111  23  2112  12  11         221  22

F-F

CRYOABLATION CATHETER

CROSS-REFERENCE

This application is the National Stage of, and therefore claims the benefit of and priority to, International Application No. PCT/CN2021/071300, filed on Jan. 12, 2021, entitled "Cryoablation Catheter," which was published as International Publication No. WO 2021/143681 A1 on Jul. 22, 2021, and which claims priority to Chinese patent application No. 202010032115.4, entitled "Cryoablation Catheter," filed with the China National Intellectual Property Administration on Jan. 13, 2020 and claims priority to Chinese patent application No. 202010183771.4, entitled "Cryoablation Catheter," filed with the China National Intellectual Property Administration on Mar. 16, 2020 the disclosures of which are hereby incorporated by reference in their entireties.

TECHNICAL FIELD

The present application relates to the technical field of cryoablation medical devices, in particular to a cryoablation catheter.

BACKGROUND

Hypertension is a major risk factor for stroke, coronary heart disease, heart failure, vascular disease, and chronic renal failure. A plurality of clinical studies have shown that intractable hypertension accounts for 20% to 30% of a total number of hypertension. Intractable hypertension refers to the failure to reach a target blood pressure value in a process of drug treatment with a highest tolerated dose (including a combined treatment of three antihypertensive drugs with diuretics). These patients are at high risk of major cardiovascular events. In recent years, prospective cohort studies and randomized controlled studies abroad have shown that transcatheter radiofrequency ablation of renal sympathetic denervation (RDN) has a significant and durable antihypertensive effect on some patients with resistant hypertension, which has broad clinical application prospects.

Kidneys play a key role in blood pressure regulation through sodium water reabsorption, regulation of renin release, and sympathetic interactions. The basic principle of RDN in the treatment of hypertension is to release energy locally through the radiofrequency catheter or other devices inserted into the renal artery, and selectively destroy the renal sympathetic nerve fibers in the outer membrane through the inner and middle membranes of the renal artery, so as to reduce the activity of renal sympathetic nerve and block the role of sympathetic overexcitation in maintaining hypertension, especially intractable hypertension.

The Chinese patent application with publication No. CN208625843U discloses a cryoablation catheter with a liquid return cavity. The cryoablation catheter includes a handle unit, a delivery unit and a refrigeration unit which are sequentially connected. The refrigeration unit includes a balloon and a cold source releasing structure arranged in the balloon, the delivery unit includes a sheath tube, and a liquid injection cavity and a liquid return cavity which are arranged in the sheath tube, a proximal end of the sheath tube is in sealing connection with a distal end of the handle unit, a distal end of the sheath tube is in sealing connection with a proximal end part of the balloon, a proximal end of the liquid injection cavity is in fluid communication with a liquid injection joint arranged on the handle unit, a distal end of the liquid injection cavity is arranged at the proximal end of the balloon and in fluid communication with the balloon, and a liquid return port of the liquid return cavity is arranged in the distal end part of the balloon. The gas in the balloon is effectively discharged, a refrigeration performance of the cryoablation catheter is improved, and a refrigeration efficiency is improved.

However, in the above patent application, the liquid is returned through the circulating liquid return cavity, the liquid in the balloon diffuses outward with a cold source release structure as a center, and its refrigeration effect is poor.

SUMMARY

One objective of the present application is to provide a cryoablation catheter, so as to solve the technical problem of a poor refrigeration effect of a cryoablation catheter in the prior art.

In order to realize the above objective, the technical solution adopted in the present application is to provide a cryoablation catheter, including a balloon and a delivery catheter passing through the balloon. Relative to the balloon, one end, close to the balloon, is a proximal end, one end, away from the balloon, is a distal end, and the delivery catheter is internally provided with a fluid inflow cavity and a fluid outflow cavity; the fluid inflow cavity extends into the balloon, an outer side of the fluid inflow cavity is provided with a spray head that injects a liquid into the balloon, and the spray head has a plurality of nozzle holes circumferentially arranged on an exterior of the fluid inflow cavity; and a tail end of the fluid outflow cavity has a cross section that seals the fluid outflow cavity, and a side wall of the fluid outflow cavity is provided with a reflow hole in communication with the balloon.

Further, the delivery catheter further includes a guide wire cavity, and the guide wire cavity passes through the balloon.

Further, before the cross section, the fluid inflow cavity and the guide wire cavity are both arranged in the fluid outflow cavity; and after the cross section, the guide wire cavity is arranged in the fluid inflow cavity.

Further, before the cross section, the fluid inflow cavity and the guide wire cavity are arranged in the fluid outflow cavity in parallel.

Further, the spray head includes a catheter body wrapped on an outer side of the fluid inflow cavity, the nozzle holes are evenly and circumferentially arranged on the catheter body, and the catheter body is in communication with the fluid inflow cavity.

Further, before the cross section, the fluid inflow cavity is located in the fluid outflow cavity, and the guide wire cavity is located in the fluid inflow cavity.

Further, before the cross section, the fluid outflow cavity, the fluid inflow cavity and the guide wire cavity are concentric round tube.

Further, the spray head is integrated with the fluid inflow cavity, and the nozzle holes are circumferentially arranged on a side wall of the fluid inflow cavity.

Further, the balloon adopts a single-layer balloon, two ends of the balloon are directly fixed to the delivery catheter, the spray head injects the liquid into the balloon, and the reflow hole is located on an inner side of a side wall of the proximal end of the balloon.

Further, the balloon adopts a double-layer balloon, and the nozzle holes are divided into a first nozzle hole that injects the liquid into a gap between the double-layer balloon and a second nozzle hole that injects the liquid into the double-layer balloon.

Further, the reflow hole is located in the gap between the double-layer balloon, the first nozzle hole is located at the distal end of the double-layer balloon, and the reflow hole is located at the proximal end of the double-layer balloon.

Further, the cryoablation catheter further includes a handle arranged at one end, away from the balloon, of the delivery catheter and an input unit, wherein the input unit includes: a guide wire cavity inlet end in communication with the guide wire cavity; a fluid inflow end in communication with the fluid inflow cavity; a fluid outflow end in communication with the fluid outflow cavity; and a catheter electronic component adapter configured to be in communication with an external instrument.

The beneficial effects of the cryoablation catheter provided by the present application lie in that: compared with the prior art, according to the cryoablation catheter of the present application, a fluid flows from the fluid inflow cavity through the nozzle holes on the spray head into the balloon. The nozzle holes are evenly distributed outside the fluid inflow cavity, so that an interior of the balloon is uniformly filled with a refrigeration fluid, ensuring the uniformity of heat exchange at each part of the balloon in an axial direction. The fluid then flows out from the reflow hole. The structural design of the present application can effectively improve the heat exchange efficiency of the fluid, and the production and processing processes are relatively simple.

BRIEF DESCRIPTION OF THE DRAWINGS

In order to more clearly illustrate the specific implementations of the present application or the technical solutions in the prior art, the following will briefly introduce the accompanying drawings needed in the description of the specific implementations or the prior art, obviously, the accompanying drawings in the following description are only some implementations, for those of ordinary skill in the art, other accompanying drawings can be acquired from these accompanying drawings without creative work.

DESCRIPTION OF REFERENCE NUMBERS

Figure 1:
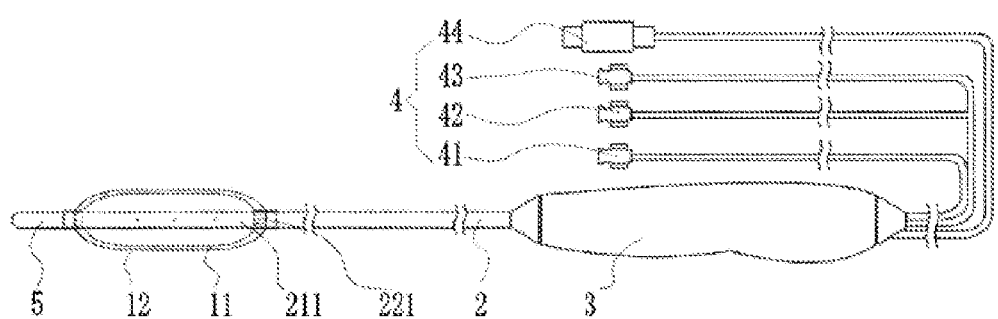
FIG. 1 is a schematic structural diagram of a cryoablation catheter provided by embodiment 1 of the present application.
Figure 2:
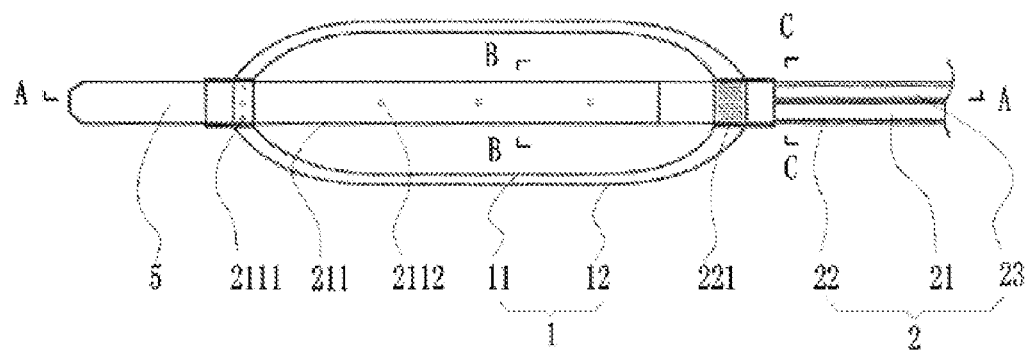
FIG. 2 is a schematic structural diagram of a balloon of a cryoablation catheter provided by embodiment 1 of the present application.
Figure 3:
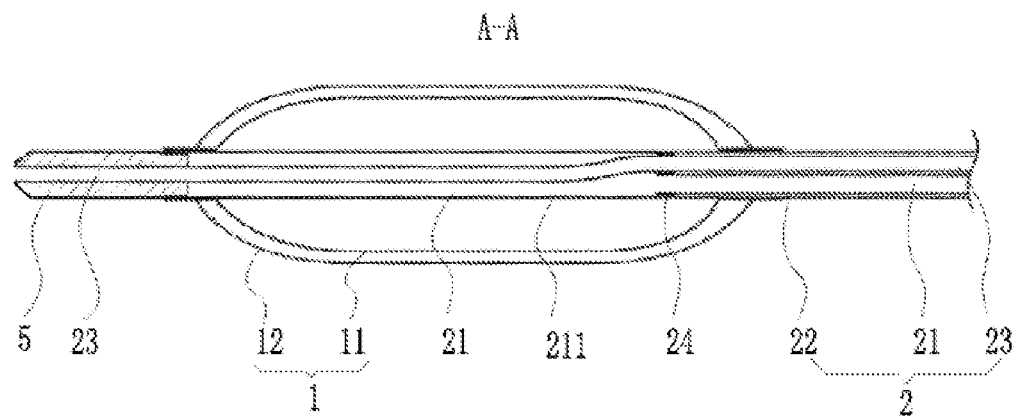
FIG. 3 is a sectional structural view along a line A-A in FIG. 2.

1—Balloon; 2—delivery catheter; 3—handle; 4—input unit; 5—end connector; 11—inner balloon; 12—outer balloon; 21—fluid inflow cavity; 211—spray head; 2111—first nozzle hole; 2112—second nozzle hole; 22—fluid outflow cavity; 221—reflow hole; 23—guide wire cavity; 24—cross section; 41—guide wire cavity inlet end; 42—fluid inflow end; 43—fluid outflow end; and 44—catheter electronic component adapter.

DETAILED DESCRIPTION

The technical solutions of the present application will be clearly and completely described below in conjunction with the accompanying drawings. Apparently, the embodiments described below are a part, but not all, of the embodiments of the present application. Based on the embodiments in the present application, all other embodiments acquired by those of ordinary skill in the art without creative work shall fall within the protection scope of the present application.

In the description of the present application, it should be noted that the orientation or position relationship indicated by the terms "center", "upper", "lower", "left", "right", "vertical", "horizontal", "inner", "outer" and the like is based on the orientation or position relationship shown in the accompanying drawings, only for the convenience of describing the present application and simplifying the description, rather than indicating or implying that the indicated device or component must have a specific orientation and be configured and operated in the specific orientation, and therefore, it should not be construed as limitations on the present application. In addition, the terms "first", "second" and "third" are only used to describe the purposes, and should not be construed to indicate or imply relative importance.

In the description of the present application, it should be noted that, unless otherwise expressly specified and limited, the terms "install", "connection" and "connect" should be understood in a broad sense. For example, it may be a fixed connection, a detachable connection, or an integrated connection; may be a mechanical connection or an electrical connection; and may be a direct connection, an indirect connection through an intermediate medium, or an internal communication of two components. For those of ordinary skill in the art, the specific meanings of the above terms in the present application may be understood in specific situations.

In addition, the technical features involved in the different implementations of the present application described below may be combined with each other as long as there is no conflict with each other.

Embodiment 1

Please refer to FIG. 1 to FIG. 6 together, the cryoablation catheter provided by the present application is now described. The cryoablation catheter includes a balloon 1, a delivery catheter 2 passing through the balloon 1, and an input unit 4 arranged at one end, away from the balloon 1, of the delivery catheter 2. Relative to the balloon 1, one end, close to the balloon 1, is a proximal end, one end, away from the balloon 1, is a distal end, and the delivery catheter 2 is internally provided with a fluid inflow cavity 21, a fluid outflow cavity 22 and a guide wire cavity 23. The fluid inflow cavity 21 and the guide wire cavity 23 may extend into the balloon 1, a spray head 211 is arranged on an outer side of the delivery catheter 2 located in the balloon 1 in a sleeving mode, the spray head 211 has a plurality of nozzle holes (not separately marked, namely a first nozzle hole 2111 and a second nozzle hole 2112) which may inject a liquid into the balloon 1. A tail end of the fluid outflow cavity 22 has a cross section 24 that seals the fluid outflow cavity 22, and the fluid outflow cavity 22 ends at the cross section 24. A side wall of the fluid outflow cavity 22 is provided with a reflow hole 221 in communication with an outer balloon 12.

According to the cryoablation catheter provided by the present application, compared with the prior art, a fluid flows from the fluid inflow cavity 21 through the nozzle holes arranged on the spray head 211 into the balloon 1, the nozzle holes on the spray head 211 are circumferentially arranged on an outer side of the fluid inflow cavity 21, so that an interior of the balloon 1 is uniformly filled with a refrigeration fluid, ensuring the uniformity of heat exchange at each part of the balloon 1 in an axial direction. The fluid then flows out from the reflow hole 221, the fluid inflow cavity 21 and the fluid outflow cavity 22 are both arranged in the delivery catheter 2 and in communication with each other to form reflowing, the heat exchange efficiency of the fluid can be effectively improved, the overall structure is simple, and the production and processing processes are simple.

The input unit 4 includes a fluid inflow end 42 in communication with the fluid inflow cavity 21, a fluid outflow end 43 in communication with the fluid outflow cavity 22, a guide wire cavity inlet end 41 in communication with the guide wire cavity 23, and a catheter electronic component adapter 44 configured to be in communication with an external instrument. The cryoablation catheter further includes a handle 3 arranged at the end, away from the balloon 1, of the delivery catheter 2, and the handle 3 is arranged on an exterior of the delivery catheter 2 in a sleeving mode, which may facilitate holding.

Specifically, the delivery catheter 2 is a catheter body integration of the whole delivery catheter, the input unit 4 is arranged at the end, away from the balloon 1, of the delivery catheter 2, and the fluid flows into from the fluid inflow end 42. The spray head 211 is arranged on an outer side of the fluid inflow cavity 21 in a sleeving mode, the nozzle holes of the spray head 211 are circumferentially arranged on the fluid inflow cavity 21 and are connected with each other, and the reflow hole 221 is arranged on the fluid outflow cavity 22. The fluid inflow cavity 21 is configured to deliver the fluid into the balloon 1, and the nozzle holes of the spray head 211 and the reflow hole 221 are configured to make the fluid uniformly flow into the balloon 1. The fluid outflow cavity 22 is configured to output the fluid in the balloon 1, so that the fluid can form a circulation, a distal end of the fluid inflow end 42 is connected to the fluid inflow cavity 21, a proximal end is connected to a Luer taper, and the connection with the external instrument can be realized through the Luer taper. A distal end of the fluid outflow end 43 is connected to the fluid outflow cavity 22, a proximal end is connected to the Luer taper, and the connection with the external instrument can be realized through the Luer taper. The catheter electronic component adapter 44 may be connected to an external control instrument, so that control and other information of the whole cryoablation catheter us transmitted to the control instrument, and the connection with an external control device is realized.

Further, please refer to FIG. 1 to FIG. 6 together, as a specific implementation of the cryoablation catheter provided by the present application, the delivery catheter 2 further includes a guide wire cavity 23, and the guide wire cavity 23 passes through the balloon 1. Specifically, a guide wire and other auxiliary related devices may be inserted into the delivery catheter 2 through the guide wire cavity inlet end 41, the guide wire cavity 23 penetrates through the whole delivery catheter 2, the proximal end is connected to the guide wire cavity inlet end 41, which may be in direct or indirect contact with a human body through the guide wire cavity 23. Of course, according to the actual situation and specific needs, in other embodiments of the present application, a separate guide wire cavity 23 may further be not arranged, and there is no unique limitation here.

The delivery catheter 2 has an end connector 5 at the other end of the balloon 1, the end connector 5 is configured to fix the balloon 1, the guide wire cavity 23 passes through the delivery catheter 2 and extends out of the balloon 1 to be in communication with the end connector 5, the guide wire cavity 23 passes through the end connector 5 to be in direct or indirect contact with the human body, a middle part of the end connector 5 is provided with an opening, and the guide wire cavity 23 is the opening, so as to be in direct or indirect contact with the external human body.

Figure 4:
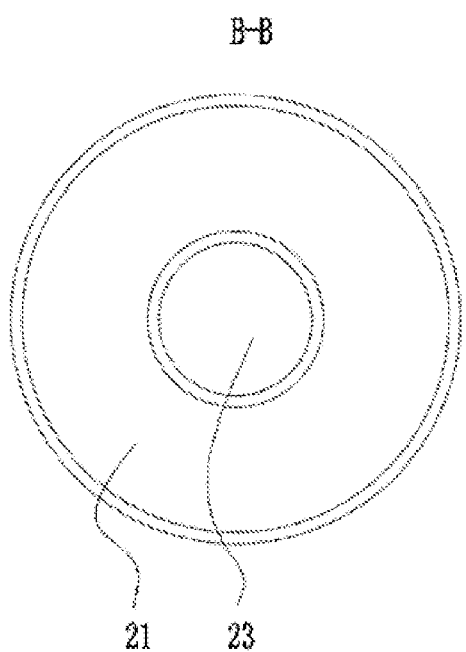
FIG. 4 is a sectional structural view along a line B-B in FIG. 2.
Figure 5:
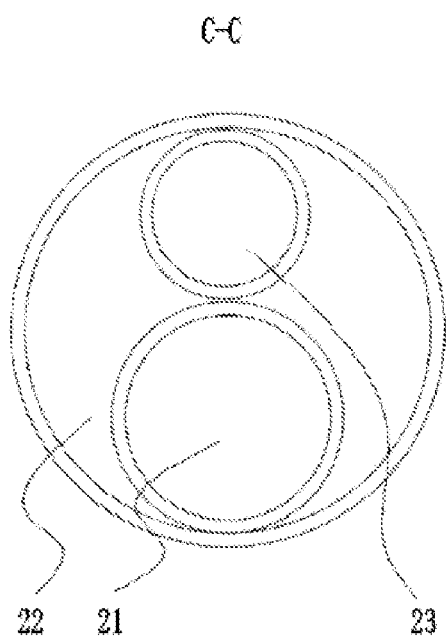
FIG. 5 is a sectional structural view along a line C-C in FIG. 2.
Figure 6:
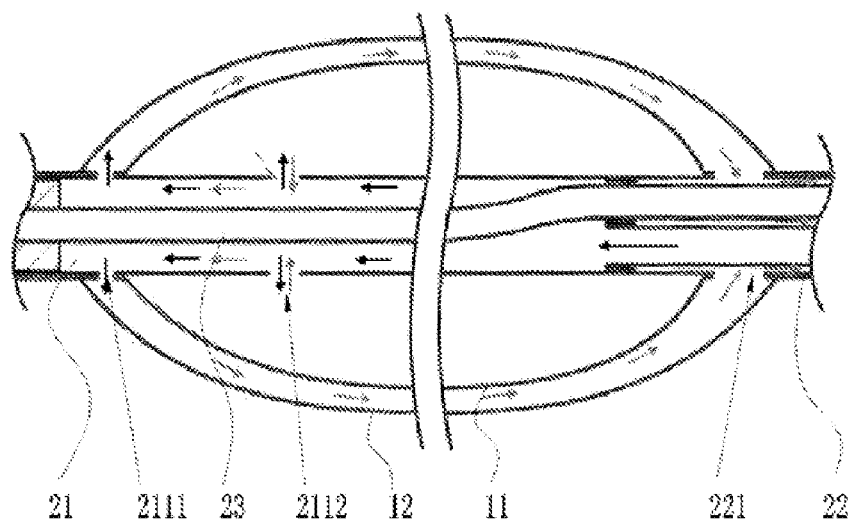
FIG. 6 is a schematic diagram of a flow direction of a fluid of a cryoablation catheter provided by embodiment 1 of the present application.
Figure 7:
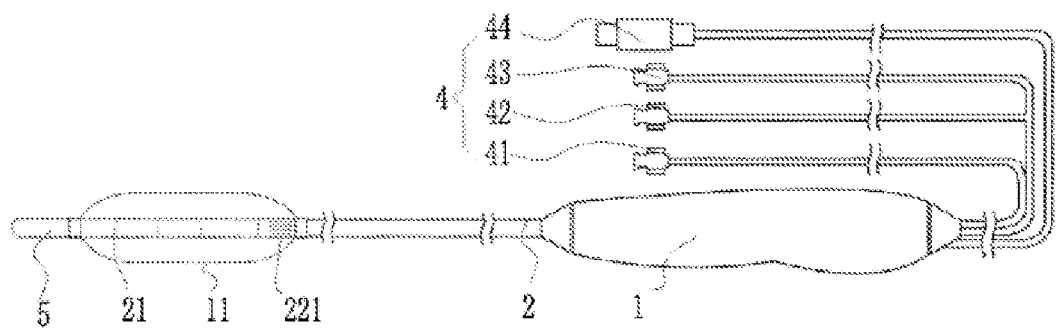
FIG. 7 is a schematic structural diagram of a cryoablation catheter provided by embodiment 2 of the present application.
Figure 8:
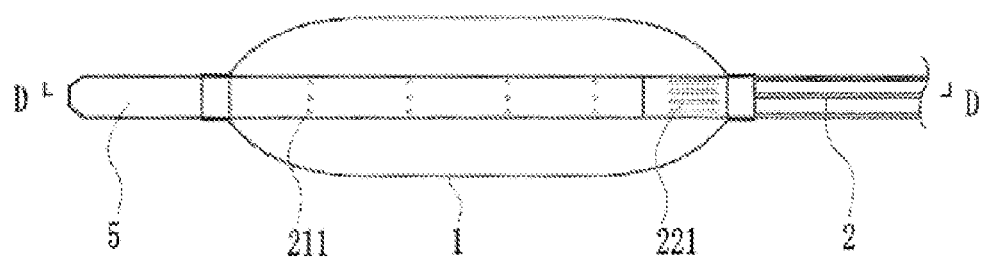
FIG. 8 is a schematic structural diagram of a balloon of a cryoablation catheter provided by embodiment 2 of the present application.
Figure 9:
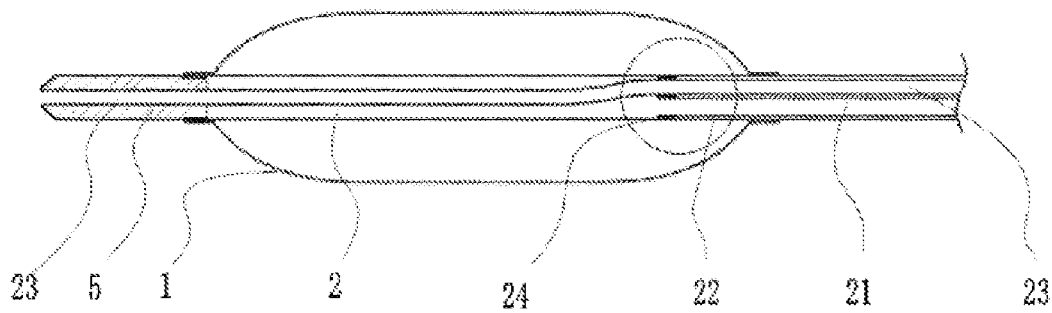
FIG. 9 is a sectional structural diagram along a line D-D in FIG. 8.
Figure 10:
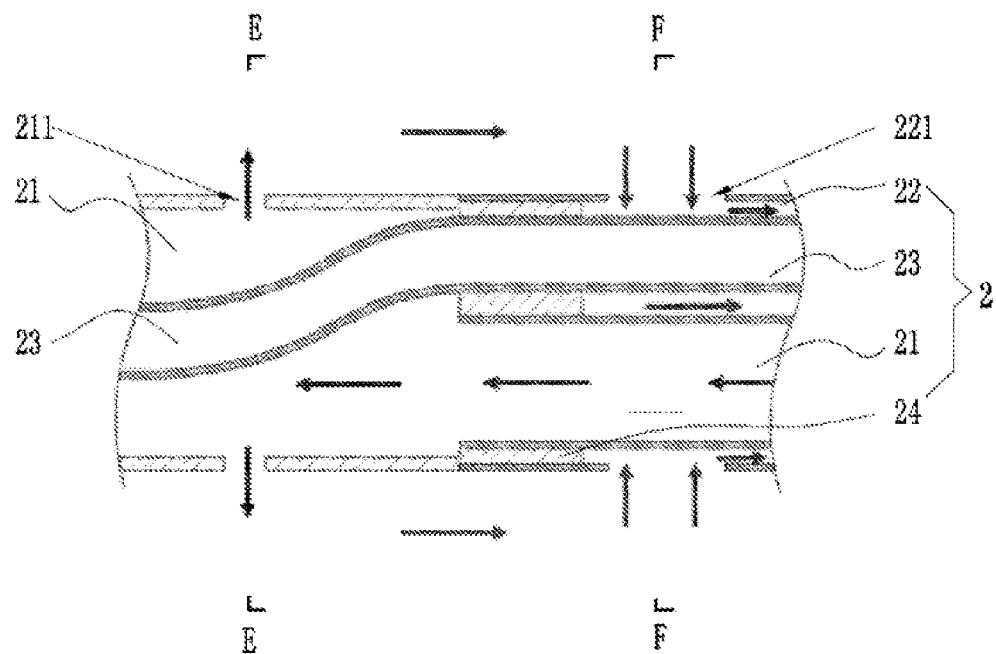
FIG. 10 is a schematic diagram of a flow direction of a fluid of a cryoablation catheter provided by embodiment 2 of the present application.
Figure 11:
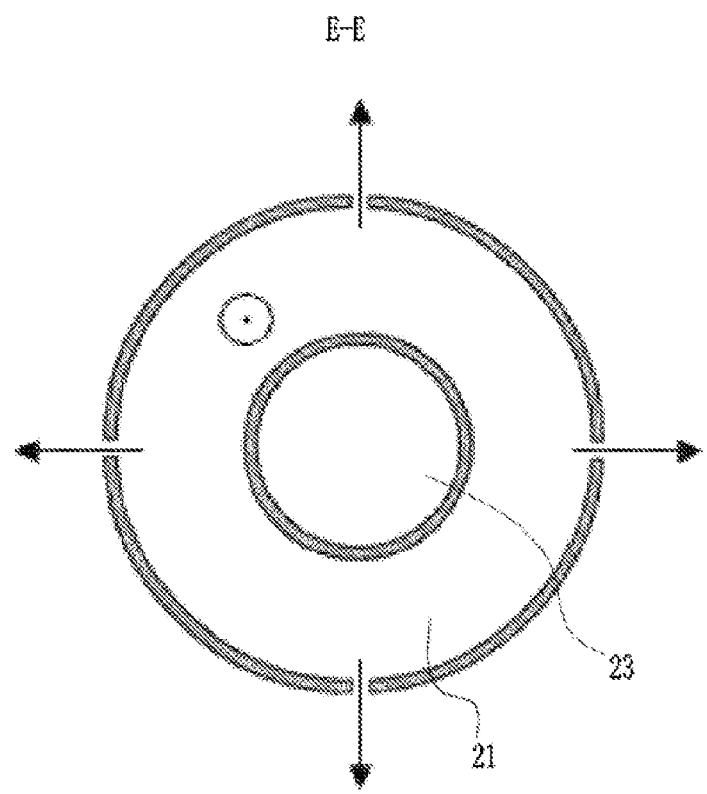
FIG. 11 is a sectional structural view along a line E-E in FIG. 10.
Figure 12:
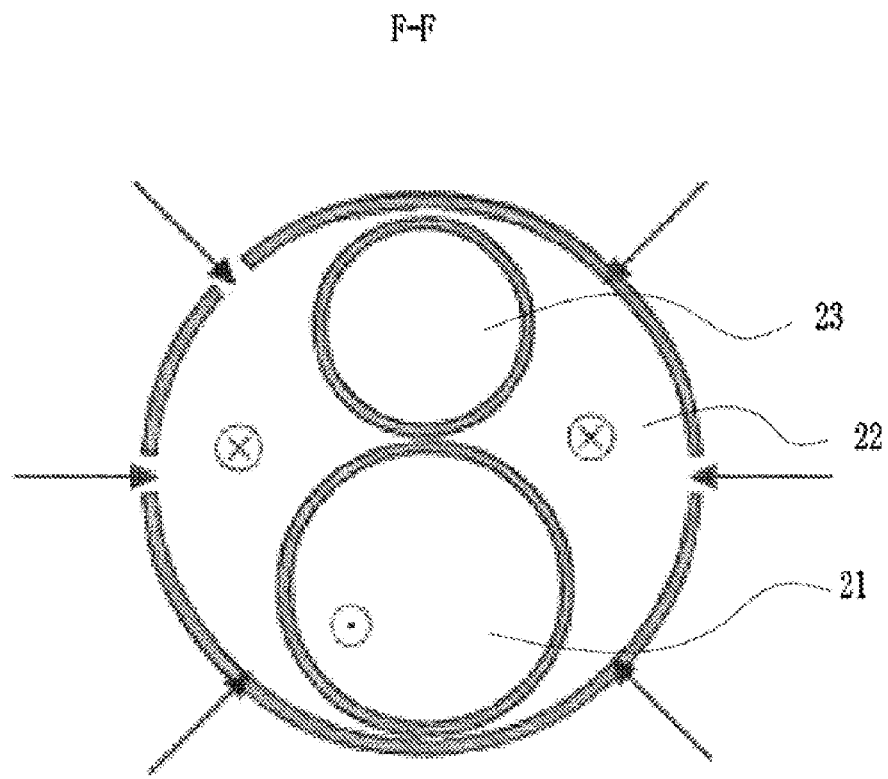
FIG. 12 is a sectional structural view along a line F-F in FIG. 10.
Figure 13:
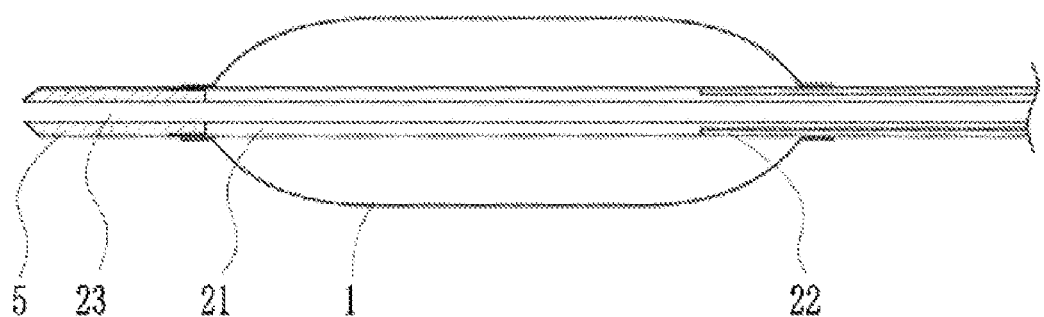
FIG. 13 is a schematic structural diagram of a balloon of a cryoablation catheter provided by embodiment 3 of the present application.
Figure 14:
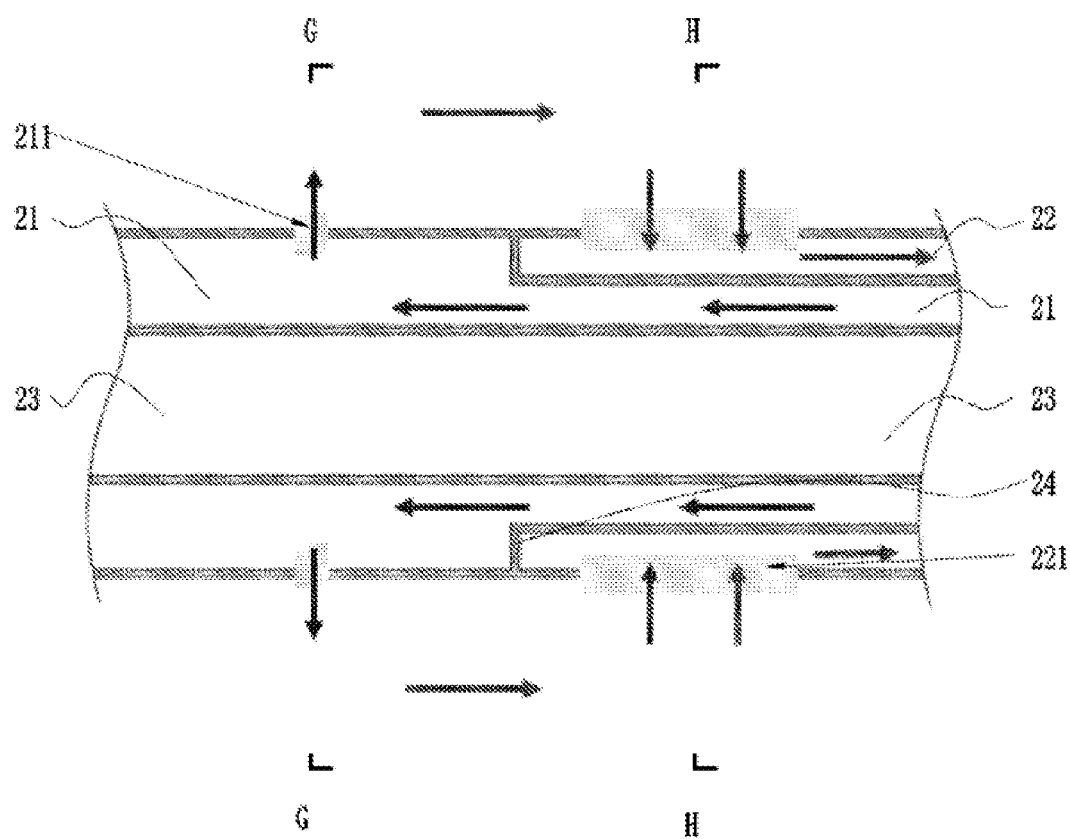
FIG. 14 is a schematic diagram of a flow direction of a fluid of a cryoablation catheter provided by embodiment 3 of the present application.
Figure 15:
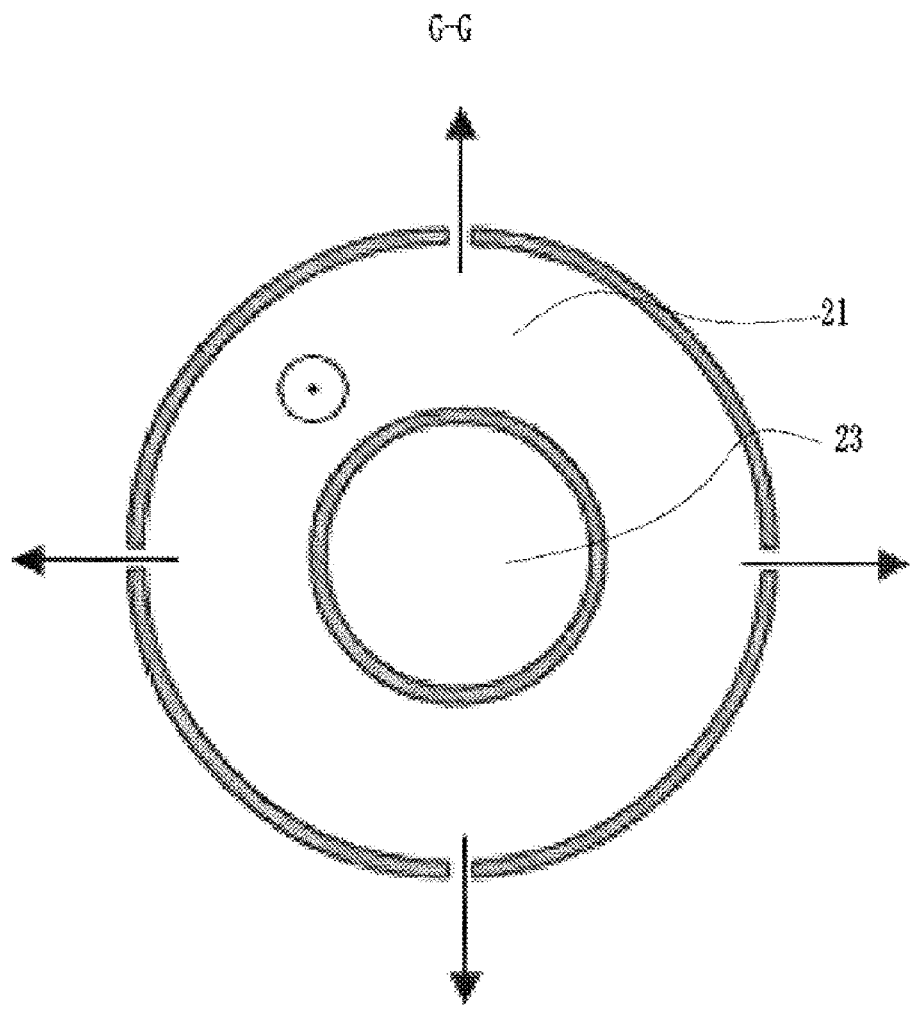
FIG. 15 is a sectional structural diagram along a line G-G in FIG. 14.
Figure 16:
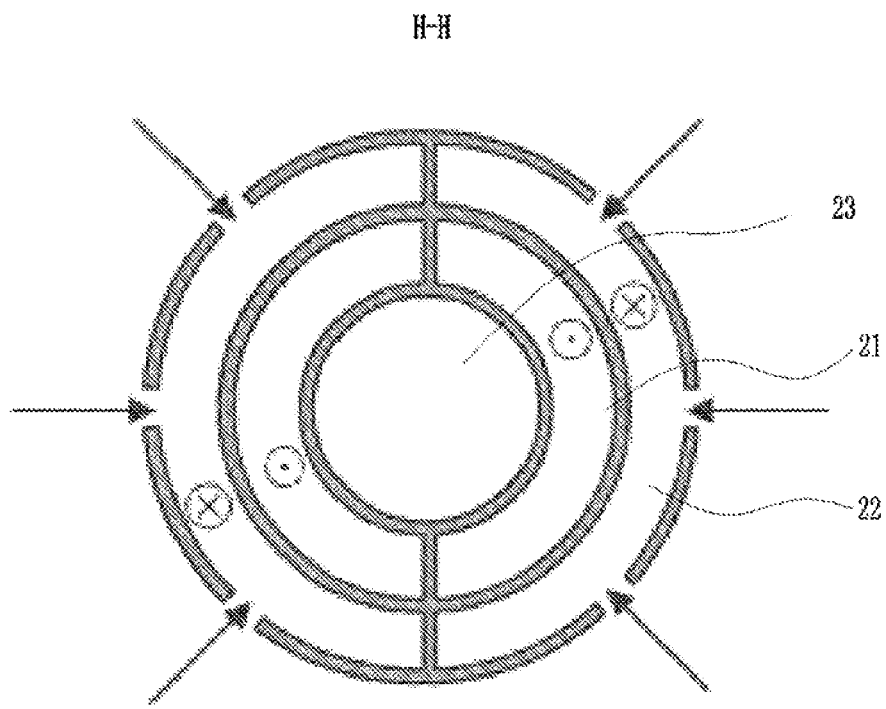
FIG. 16 is a sectional structural view along a line H-H in FIG. 14.

Further, please refer to FIG. 4 to FIG. 6, as a specific implementation of the cryoablation catheter provided by the present application, before the cross section 24, the fluid inflow cavity 21 and the guide wire cavity 23 are both arranged in the fluid outflow cavity 22. After the cross section 24, the guide wire cavity 23 is arranged in the fluid inflow cavity 21. Specifically, the cross section 24 is configured to partition and seal the fluid outflow cavity 22, the reflow hole 221 is located at a proximal end of the cross section 24, the cross section 24 and the reflow hole 221 are both arranged in the balloon 1, the reflow hole 221 is arranged in the outer balloon 12, and may be in communication with the fluid in the outer balloon 12, which ensures that the fluid in the balloon reflows to the fluid outflow cavity 22 through the reflow hole 221. The cross section 24 and the reflow hole 221 are both sequentially arranged at the proximal end of the balloon 1, so that the liquid may flow out of the reflow hole 221 after filling the balloon 1, and the problems that the liquid flows out of the reflow hole 221 without filling the balloon 1, resulting in a low utilization of the fluid are avoided.

Further, please refer to FIG. 6, as a specific implementation of the cryoablation catheter provided by the present application, the balloon 1 adopts a double-layer balloon 1, and the nozzle holes 221 include a first nozzle hole 2111 that injects the liquid into a gap between the double-layer balloon 1 and a second nozzle hole 2112 that injects the liquid into the double-layer balloon. Specifically, the double-layer balloon 1 means that the balloon 1 has an inner balloon 11 and an outer balloon 12, the inner balloon 11 is wrapped in the outer balloon 12, there is a gap between the inner balloon 11 and the outer balloon 12, so that the fluid may flow between the inner balloon 11 and the outer balloon 12, the proximal ends of the inner balloon 11 and the outer balloon 12 are directly fixed to an outer edge of the fluid outflow cavity 22, and the distal ends are fixed to the end connector 5. The first nozzle hole 2111 is arranged in the inner balloon 11 to inject the liquid into the inner balloon 11, and may include a plurality of nozzle holes uniformly arranged in the inner balloon 11, and the nozzle holes may be surrounded into an annulus and uniformly arranged at intervals. The second nozzle hole 2112 is arranged in the inner balloon 11, and also is an annulus to inject the liquid into the inner balloon 11. The stability of the whole balloon 1 can be improved through the double-layer balloon 1, moreover, the liquid between the inner balloon 11 and the outer balloon 12 is cooled by the liquid in the inner balloon 11, the heat transmission ensures that a cooling degree of the liquid between the inner balloon 11 and the outer balloon 12 is high, and a cooling region is relatively uniform, which effectively avoids the problem of nonuniform heat and cold prone caused by a single-layer balloon.

Preferably, the spray head 211 is arranged in the balloon 1, the first nozzle hole 2111 is circumferentially arranged at a distal end of the spray head 211 in a single row, and the second nozzle hole 2112 is circumferentially arranged in the middle of the spray head 211 in a multi-row.

Since in front of the cross section 24, the fluid outflow cavity 22 needs to be in direct communication with the interior of the balloon 1, the fluid inflow cavity 21 and the guide wire cavity 23 are both directly arranged in the fluid outflow cavity 22 in front of the cross section 24, the reflow hole 221 is directly arranged on the fluid outflow cavity 22, namely on an outer side wall of the whole delivery catheter 2, so that a reflow effect is better, and the structure and processing are relatively simple. Behind the cross section 24, the fluid outflow cavity 22 has been sealed by the cross section 24, that is, there is no fluid outflow cavity 22. The fluid inflow cavity 21 is sequentially connected to the spray head 211 and the end connector 5. The spray head 211 is in communication with the interiors of the inner balloon 11 and the outer balloon 12 and delivers the fluid into the interiors, the reflow hole 221 is not arranged in the inner balloon 11, according to a fluid flow law, when filling the inner balloon 11, the fluid may flow from the second nozzle hole 2112; and when the inner balloon 11 is fully filled, the fluid may flow out of the second nozzle hole 2112, and such design has a better effect and relatively simple structure and processing.

Further, please refer to FIG. 5, as a specific implementation, before the cross section 24, the fluid inflow cavity 21 and the guide wire cavity 23 are arranged in the fluid outflow cavity 22 in parallel. Specifically, in front of the cross section 24, an outer side wall of the delivery catheter 2 is an outer side wall of the fluid outflow cavity 22, and two parallel tube wires of the fluid inflow cavity 21 and the guide wire cavity 23 are arranged in the delivery catheter 2. A separate blocking component (not marked in figure) is arranged at the cross section 24, an outer edge of the blocking component directly abuts against an inner side wall of the delivery catheter 2, the blocking component is provided with a through hole for the tube wires of the fluid inflow cavity 21 and the guide wire cavity 23 to pass through, the through hole is in sealing connection with the fluid inflow cavity 21 or the guide wire cavity 23, that is, at this time, the fluid outflow cavity 22 is partitioned by the blocking component, and the fluid inflow cavity 21 and the guide wire cavity 23 can still deliver. Behind the cross section 24, the fluid inflow cavity 21 is no longer provided with a separate tube wire, that is, the fluid inflow cavity 21 is directly connected to the spray head 211, and the guide wire cavity 23 is still provided with a separate tube wire. The catheter prepared by this mode is provided with a separate tube wire in front of the cross section 24, and then is adjusted behind the cross section 24, that is, processing can be facilitated, the structure is relatively simple, and processing is convenient.

Of course, according to the actual situations and specific needs, in other embodiments of the present application, it may further be: in front of the cross section 24, the fluid outflow cavity 22, the fluid inflow cavity 21 and the guide wire cavity 23 are all separate tube wires, a connecting catheter is arranged at the cross section 24, and is provided with a sealing wall at the cross section 24, the tube wire of the fluid outflow cavity 22 may be directly and fixedly arranged on the connecting catheter in a sleeving mode and in communication with the connection catheter, and is sealed by the blocking cross section 24. The fluid inflow cavity 21 and the guide wire cavity 23 may both directly pass through the sealing wall, the fluid inflow cavity 21 is no longer provided with a separate tube wire after passing through the sealing wall, so that the fluid directly flows into the connecting catheter, the guide wire cavity 23 is still provided with a separate catheter body, so that the normal operation of a guide wire is ensured, and there is not unique limitation here.

Since in the embodiment, when the guide wire cavity 23 is close to the cross section 24, the guide wire cavity 23 approaches to the middle of the fluid inflow cavity 21 from the side wall of the fluid outflow cavity 22, the fluid flow velocity on both sides of the fluid inflow cavity 21 close to the cross section 24 is inconsistent, that is, the fluid flow velocity on both sides of the guide wire cavity 23 in a region where bending occurs is different. Therefore, in order to ensure the uniformity of heat exchange in the balloon 1, the first nozzle hole 2111 is arranged on one side away from the cross section 24.

A spray head 211 of a catheter body is arranged on the outer side of the fluid inflow cavity 21 in a sleeving mode, the spray head 211 of the catheter body is in communication with the fluid inflow cavity 21, and the first nozzle hole 2111 and the second nozzle hole 2112 are both formed in the spray head 211 of the catheter body. Through the transfer of the spray head 211 of the catheter body, the first nozzle hole 2111 and the second nozzle hole 2112 can uniformly spray out the fluid, so that the uniformity of heat exchange in the balloon 1 is ensured.

Further, please refer to FIG. 6, as a specific implementation of the cryoablation catheter provided by the present application, the reflow hole 221 is located in the gap between the double-layer balloon 1, the first nozzle hole 2111 is located at the distal end of the double-layer balloon 1, and the reflow hole 221 is located at the proximal end of the double-layer balloon 1. Since a volume in the inner balloon 11 is limited, and a reflow hole 221 is not arranged in the inner balloon 11, the liquid sprayed by the second nozzle hole 2112 needs to reflow into the spray head 211 through the second nozzle hole 2112, and then is sprayed between the inner balloon 11 and the outer balloon 12 by the first nozzle hole 2111, so that the liquid can be recycled, and the liquid flowing into the inner balloon 11 may further cool the liquid between the inner balloon 11 and the outer balloon 12 repeatedly, so as to ensure the uniformity of internal cooling of the whole balloon 1. The reflow hole 221 is arranged at the proximal end of a flow channel between the inner balloon 11 and the outer balloon 12, which can ensure that the liquid can realize complete circulation in the double-layer balloon 1, and avoid that the liquid directly flows out of the reflow hole 221 without circulation. Of course, according to the actual situations and the specific needs, in other embodiments of the present application, the reflow hole 221 may also be arranged on one side, close to the proximal end, of the interior of the inner balloon 11, and there is no unique limitation here.

Preferably, the reflow hole 221 is arranged in the outer balloon 12, at this time, it can be ensured that the fluid flows into the outer balloon 12 through the interior of the inner balloon 11 to flow out, so that the fluid in the balloon 1 may fully flow.

Embodiment 2

Please refer to FIG. 7 to FIG. 12, as another specific implementation of the cryoablation catheter provided by the present application, the difference between this embodiment and embodiment 1 is that the balloon 1 adopts a single-layer balloon, the proximal end of the balloon 1 is directly fixed to an outer edge of the fluid outflow cavity 22, and the distal end is fixed to the end connector 5. The spray head 211 injects the liquid into the balloon 1, and the reflow hole 221 is located on an inner side of a side wall of the proximal end of the balloon 1. The spray head 211 may only include second nozzle holes 2112 which directly inject the liquid into the balloon 1.

The plurality of second nozzle holes 2112 directly and uniformly surround the outer side of the spray head 211 at intervals, and the second nozzle holes 2112 may further extend in a transmission direction of the delivery catheter 2. The reflow hole 221 is arranged at the proximal end of the balloon 1, and the reflow hole 221 is arranged in the balloon 1, which can ensure that the liquid can realize complete circulation in the balloon 1, and avoid that the liquid directly flows out of the reflow hole 221 without circulation.

Embodiment 3

Please refer to FIG. 13 to FIG. 16, as another specific implementation of the cryoablation catheter provided by the present application, the difference between this embodiment and embodiment 1 is that the delivery catheter 2 adopts a multi-cavity duct, before the cross section 24, the fluid inflow cavity 21 and the guide wire cavity 23 are both arranged in the fluid outflow cavity 22. After the cross section 24, the guide wire cavity 23 is arranged in the fluid inflow cavity 21, and before the cross section 24, the fluid inflow cavity 21 is located in the fluid outflow cavity 22, and the guide wire cavity 23 is located in the fluid inflow cavity 21. Specifically, the delivery catheter 2 adopts a mode of nesting multiple ducts layer by layer, since in front of the cross section 24, the fluid outflow cavity 22 needs to be in direct communication with the interior of the balloon 1, the fluid outflow cavity 22 is located at the outermost layer in front of the cross section 24, a catheter body of the fluid inflow cavity 21 is directly arranged in the fluid outflow cavity 22, and the outer side of the duct of the fluid inflow cavity 21 is the fluid outflow cavity 22; then the catheter body of the guide wire cavity 23 is directly arranged in the fluid outflow cavity 22, and the outer side of the duct of the guide wire cavity 23 is the fluid inflow cavity 21; and at this time, the reflow hole 221 may be directly arranged on an outer side wall of the whole delivery catheter 2, so that the reflow effect is better, and the structure and processing are relatively simple.

Behind the cross section 24, a gap between the outer edge of the fluid inflow cavity 21 and the delivery catheter 2 is sealed by the cross section 24, that is, there is no fluid outflow cavity 22, a blocking method of the cross section 24 at this time may be that the inner side wall of the fluid outflow cavity 22 is adhered to the outer side wall of the delivery catheter 2, or the tail end of the fluid outflow cavity 22 is sealed by arranging a blocking piece, and at this time, a blocking effect of the cross section 24 can be realized. The spray head 211 of the fluid inflow cavity 21 needs to be connected to the interior of the balloon 1, and deliver the fluid into the balloon 1, therefore, the fluid inflow cavity 21 is directly arranged on the outermost part of the delivery catheter 2, and at this time, the outer wall of the fluid inflow cavity 21 may be directly attached and fixed to the outer wall of the delivery catheter 2. The spray head 211 is directly arranged on the outer side of the fluid inflow cavity 21 in a sleeving mode, so that the liquid flows into the balloon 1 through the spray head 211; or the spray head 211 and the fluid inflow cavity 21 are directly one component, and the nozzle holes are directly formed in the side wall of the fluid inflow cavity 21, so that a spraying effect of the nozzle holes is better, and the structure and processing are relatively simple.

Preferably, in the embodiment, since the guide wire cavity 23 is always located in a middle region of the whole delivery catheter 2, the flow velocity and flow rate of the fluid on both sides of the guide wire cavity 23 are the same, so the spray head 211 may be a through hole directly formed in the side wall of the fluid inflow cavity 21, and the effect of uniform head exchange can be realized.

Further, referring to FIG. 6, as a specific implementation of the cryoablation catheter provided by the present application, before the cross section 24, the fluid outflow cavity 22, the fluid inflow cavity 21 and the guide wire cavity 23 are concentric round tube. Specifically, the nesting mode of the fluid outflow cavity 22, the fluid inflow cavity 21 and the guide wire cavity 23 is nesting of layer by layer, the mode adopting the concentric round tube is that the three cavities are concentric, at this time, the production and processing may be more facilitated, it can be ensured that the flow of the liquid on both sides is consistent, and the problem of excessive flow on single side is avoided.

Embodiment 4

Figure 17:
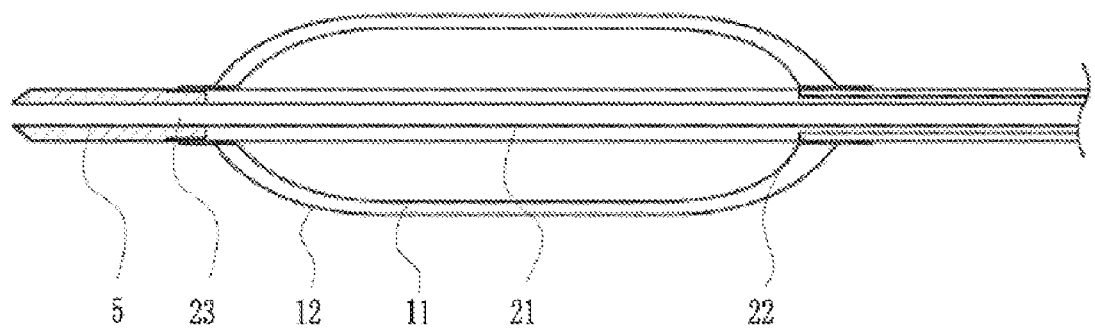
FIG. 17 is a schematic structural diagram of a balloon of a cryoablation catheter provided by embodiment 4 of the present application.

Please refer to FIG. 17, as another specific implementation of the cryoablation catheter provided by the present application, the difference between this embodiment and embodiment 1 is that the balloon 1 still adopts a double-layer balloon 1, but the delivery catheter 2 adopts a multi-cavity duct, the structure and layout of the double-layer balloon 1 are consistent with those in embodiment 1, and the delivery catheter 2 is consistent with the delivery catheter 2 in embodiment 3 in structure.

Apparently, the above embodiments are only examples for clear explanation, and are not limited to the implementations. For ordinary technical personnel in the art, other different forms of variations or changes may further be made on the basis of the above description. It is unnecessary and impossible to enumerate all the implementations here. The apparent variations and changes introduced thereby are still within the scope of protection created by the present application.

What is claimed is:

1. A cryoablation catheter, comprising a balloon and a delivery catheter passing through the balloon, wherein relative to the balloon, one end, close to the balloon, is a proximal end, one end, away from the balloon, is a distal end, and the delivery catheter is internally provided with:
- a fluid inflow cavity, wherein the fluid inflow cavity extends into the balloon, an outer side of the fluid inflow cavity is provided with a spray head that injects a liquid into the balloon, and the spray head has a plurality of nozzle holes circumferentially arranged on the exterior of the fluid inflow cavity; and
- a fluid outflow cavity, wherein a tail end of the fluid outflow cavity has a cross section that seals the fluid outflow cavity, and a side wall of the fluid outflow cavity is provided with a reflow hole in communication with the balloon.

2. The cryoablation catheter according to claim 1, wherein the delivery catheter further includes a guide wire cavity, and the guide wire cavity passes through the balloon.

3. The cryoablation catheter according to claim 2, wherein before the cross section, the fluid inflow cavity and the guide wire cavity are both arranged in the fluid outflow cavity; and after the cross section, the guide wire cavity is arranged in the fluid inflow cavity.

4. The cryoablation catheter according to claim 3, wherein before the cross section, the fluid inflow cavity and the guide wire cavity are arranged in the fluid outflow cavity in parallel.

5. The cryoablation catheter according to claim 4, wherein the spray head includes a catheter body wrapped on an outer side of the fluid inflow cavity, the nozzle holes are evenly and circumferentially arranged on the catheter body, and the catheter body communicates with the fluid inflow cavity.

6. The cryoablation catheter according to claim 3, wherein before the cross section, the fluid inflow cavity is located in the fluid outflow cavity, and the guide wire cavity is located in the fluid inflow cavity.

7. The cryoablation catheter according to claim 6, wherein before the cross section, the fluid outflow cavity, the fluid inflow cavity and the guide wire cavity are concentric round tube.

8. The cryoablation catheter according to claim 7, wherein the spray head is integrated with the fluid inflow cavity, and the nozzle holes are circumferentially arranged on a side wall of the fluid inflow cavity.

9. The cryoablation catheter according to claim 1, wherein the balloon adopts a single-layer balloon, two ends of the balloon are directly fixed to the delivery catheter, the spray head injects the liquid into the balloon, and the reflow hole is located on an inner side of a side wall of the proximal end of the balloon.

10. The cryoablation catheter according to claim 1, wherein the balloon adopts a double-layer balloon, and the nozzle holes are divided into a first nozzle hole that injects the liquid into a gap between the double-layer balloon and a second nozzle hole that injects the liquid into the double-layer balloon.

11. The cryoablation catheter according to claim 10, wherein the reflow hole is located in the gap between the double-layer balloon, the first nozzle hole is located at the distal end of the double-layer balloon, and the reflow hole is located at the proximal end of the double-layer balloon.

12. The cryoablation catheter according to claim 2, further comprising a handle arranged at one end, away from the balloon, of the delivery catheter and an input unit, wherein the input unit comprises:
- a guide wire cavity inlet end in communication with the guide wire cavity;
- a fluid inflow end in communication with the fluid inflow cavity;
- a fluid outflow end in communication with the fluid outflow cavity; and
- a catheter electronic component adapter configured to be in communication with an external instrument.

13. The cryoablation catheter according to claim 2, wherein the balloon adopts a single-layer balloon, two ends of the balloon are directly fixed to the delivery catheter, the spray head injects the liquid into the balloon, and the reflow hole is located on an inner side of a side wall of the proximal end of the balloon.

14. The cryoablation catheter according to claim 2, wherein the balloon adopts a double-layer balloon, and the nozzle holes are divided into a first nozzle hole that injects the liquid into a gap between the double-layer balloon and a second nozzle hole that injects the liquid into the double-layer balloon.

15. The cryoablation catheter according to claim 3, further comprising a handle arranged at one end, away from the balloon, of the delivery catheter and an input unit, wherein the input unit comprises:
- a guide wire cavity inlet end in communication with the guide wire cavity;
- a fluid inflow end in communication with the fluid inflow cavity;
- a fluid outflow end in communication with the fluid outflow cavity; and
- a catheter electronic component adapter configured to be in communication with an external instrument.

16. The cryoablation catheter according to claim 3, wherein the balloon adopts a single-layer balloon, two ends of the balloon are directly fixed to the delivery catheter, the spray head injects the liquid into the balloon, and the reflow hole is located on an inner side of a side wall of the proximal end of the balloon.

17. The cryoablation catheter according to claim 3, wherein the balloon adopts a double-layer balloon, and the nozzle holes are divided into a first nozzle hole that injects the liquid into a gap between the double-layer balloon and a second nozzle hole that injects the liquid into the double-layer balloon.

18. The cryoablation catheter according to claim 4, further comprising a handle arranged at one end, away from the balloon, of the delivery catheter and an input unit, wherein the input unit comprises:
- a guide wire cavity inlet end in communication with the guide wire cavity;
- a fluid inflow end in communication with the fluid inflow cavity;
- a fluid outflow end in communication with the fluid outflow cavity; and
- a catheter electronic component adapter configured to be in communication with an external instrument.

19. The cryoablation catheter according to claim 4, wherein the balloon adopts a single-layer balloon, two ends of the balloon are directly fixed to the delivery catheter, the spray head injects the liquid into the balloon, and the reflow hole is located on an inner side of a side wall of the proximal end of the balloon.

20. The cryoablation catheter according to claim 4, wherein the balloon adopts a double-layer balloon, and the nozzle holes are divided into a first nozzle hole that injects the liquid into a gap between the double-layer balloon and a second nozzle hole that injects the liquid into the double-layer balloon.

\* \* \* \* \*